Aug. 11, 1970   G. W. GILLEMOT ET AL   3,523,607
SERVICE WIRE ENCAPSULATING KIT
Filed July 8, 1968   2 Sheets-Sheet 1
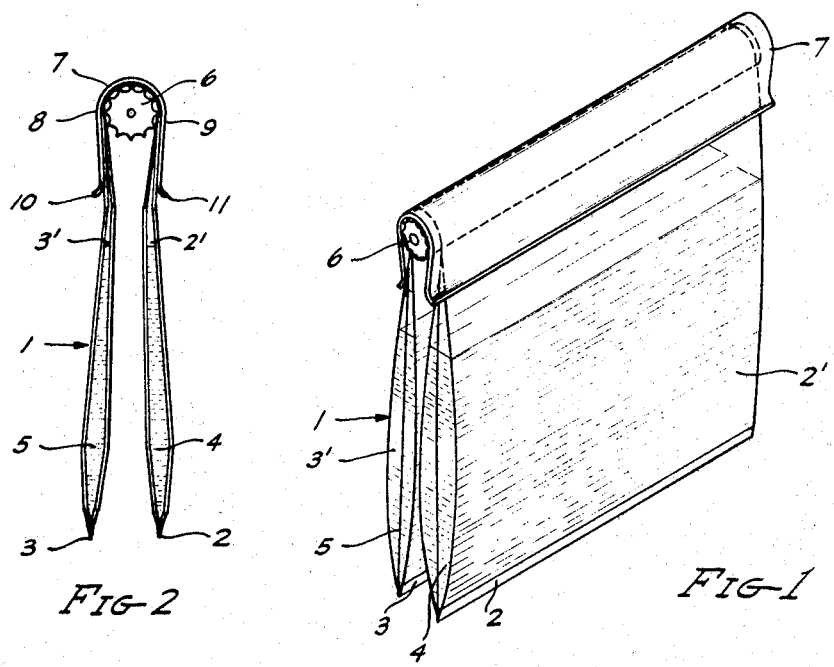
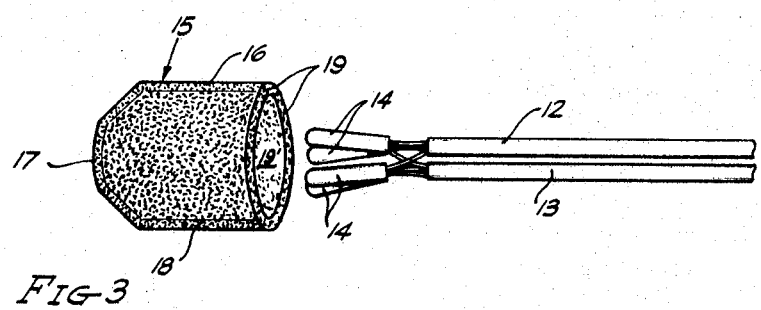
INVENTOR.
GEORGE W. GILLEMOT
JOHN T. THOMPSON
BY
ATTORNEYS United States Patent Office 3,523,607
Patented Aug. 11, 1970

3,523,607
SERVICE WIRE ENCAPSULATING KIT
George W. Gillemot, Venice, Calif. (2331 20th St., Santa Monica, Calif. 90405), and John T. Thompson, Tarzana, Calif. (244 Loring St., Los Angeles, Calif. 90024)
Filed July 8, 1968, Ser. No. 743,160
Int. Cl. B65d 75/00, 33/16; H02g 13/02
U.S. Cl. 206—47
2 Claims

ABSTRACT OF THE DISCLOSURE

A kit for encapsulating splices in sheathed or unsheathed multi-filament cables including a single compartment container which is divided into a plurality of fluid-tight compartments by means of a spline and a ridged or flexible clip which fits over the container and the spline. The container may also be used as the encapsulating mold for the splice and the spline and clip or clip alone used to hold this mold gathered about the cabling. An open-cell flexible spacer member or boot serves to center a butt-end splice in the encapsulating material.

BACKGROUND OF THE INVENTION

Field of the invention

The present invention relates to a system for encapsulating splices in sheathed or unsheathed multi-filament cables and, more particularly, to a method and means for (1) packaging the materials used for encapsulating such cables, (2) enclosing the encapsulated splice in the packaged material, and (3) centering the spliced cable within the encapsulating material.

Description of the prior art

It is often required that multi-filament cables, such as telephone and electrical cables, be spliced for repair or modification purposes after they have been placed in service. Such splicing must often be done outdoors, in the field, under adverse conditions. In addition, a wide variety of cable sizes and shapes must be spliced and a wide variety of splice configurations exist. Furthermore, it is usually a requirement that a splice closure of good durable quality be achieved rapidly, inexpensively and with portable equipment.

One method of preparing a splice closure in multi-filament cables is to encapsulate the joined filaments in some fluid encapsulating compound or agent which is hardened in situ. The advantages of such a closure are that by completely covering the splice area, it is protected with a solid, tough, waterproof, flexible, insulating covering. Preferred encapsulating materials are initially in the form of two or more separate components. When uniformly mixed together, these components are at first a thin liquid; but on standing for a short time, a reaction occurs and the mixture is converted to a solid, cured form which provides positive and complete protection of the cable splice.

Although such a technique for encapsulating splices in sheathed or unsheathed multi-filament cables is ideal in theory, considerable difficulties have been experienced in reducing the theory to practice. First of all, the two or more part encapsulating compound must be packaged in some manner which will permit the convenient mixing of the component parts. It is evident that if separate packages are provided for each component, an additional package must be provided, if a size sufficient to contain all of the components, so that they may be mixed together. Since it has generally been inconvenient to provide at least three separate containers, it has been proposed to package the separate components in a single compartment container which includes means for holding the separate components apart until it is desired that they be mixed. To this end, a barrier is provided across the width of the container at a point intermediate the ends thereof. Such a barrier has generally been formed by bonding or heat sealing the opposite sides of the container along a narrow strip across the width thereof. Thereafter, in order to cause mixing of the two components of the encapsulating material, it is necessary to break the barrier to form a single continuous container. However, in such cases, considerable difficulty has been experienced in breaking such a barrier to permit intermingling of the components. Very often, instead of breaking the barrier, one or more of the sides of the container are broken causing spillage and waste of the chemical components. This result is not only undesirable because of the waste involved, but because the chemicals are generally harmful when they come in contact with the skin of the user.

Another problem has been in providing a suitable closure which will support and contain the cable splice and the encapsulating material. Previously, it has been necessary to use metal splice cases, lead sleeves or other special fittings to accomplish splice closure, particularly in the case of buried cables. Rather than employing pre-formed splice closures, it has also been proposed to use strips of plastic or elastic film or sheet material which are wound around the splice area to form a non-rigid envelope into which the liquid encapsulating mixture may be introduced. However, all of these enclosures have generally been cumbersome and inconvenient to use.

A further problem has existed in providing an encapsulated splice wherein the walls of the solidified encapsulating compound are of substantially uniform thickness. This is required because a wall that is too thin often fails and a wall that is too thick results in a waste of encapsulating compound. One proposed solution to this problem is to first wrap the splice area with a strip or strips of a porous, insulating filler to a shape and thickness capable of providing adequate protection for the cable and to provide for centering of the splice in the closure. However, because the spacer material is generally provided in strips or rolls, the procedure has generally been time-consuming and the centering of the splice area in the closure has been haphazard and inexact.

SUMMARY OF THE INVENTION

According to the present invention, these and other disadvantages of the prior art have been overcome by providing a system for encapsulating splices in sheathed or unsheathed multi-filament cables. The present invention includes a barrier for dividing a flexible-walled, single compartment container into a plurality of fluid-tight compartments so as to separate the two or more component parts of the encapsulating compound, which barrier may be rapidly and efficiently removed so that there is no chance of damaging the container. Furthermore, according to the present invention and in the case of a butt-end splice, the same container which houses the encapsulating material may be used as the closure for the resultant encapsulated splice and the barrier which was previously used to separate the two components may be used to seal the closure. In addition, centering of the splice area within the encapsulating compound is achieved automatically by providing an open-cell, flexible spacer member in the form of a boot. Finally, a novel in-line closure is provided with a unique end sealing technique which allows for a custom fit around one or more cables and wires of varying diameters.

More specifically, the present invention comprises a splice closure which is made by preparing a splice bundle in a multi-filament cable, positioning an open-pore, flexible spacer member around the splice bundle, enclosing the splice bundle and flexible spacer member in a flexible container and placing a fluid encapsulating material in the container. The splice bundle is spaced at a substantially uniform distance from the walls of the container by the spacer member. The encapsulating material flows freely through the spacer member and thoroughly saturates the member. The splice bundle is automatically centered in the enclosure formed by the container so that the walls of the finished splice closure are of a substantially uniform thickness. The quantity of encapsulating material required is reduced by the volume of the material in the spacer member. On the other hand, this is achieved without sacrificing the electrical and strength properties of the splice closure walls which are maintained substantially constant throughout because the encapsulating material thoroughly saturates the spacer member.

According to one embodiment of the present invention, the container is formed from a flexible-walled, elongated, tubular bag which is initially sealed at both ends thereof and adapted to contain the two components from which the encapsulating material is formed. The two components are held separated in the container by means of an elongated cylindrical inner member which has a length which is at least as great as the width of the container, the inner member being applied against the midportion of the container between the separate components to divide the container into two compartments. A stiff but flexible elongated clip member, having a length which is approximately equal to the length of the inner member, is adapted to be pressed over the inner member and to contact at least the opposite sides thereof to hold the midportion of the container walls snugly pressed against each other. In this manner, a tight seal is provided between the two sides of the container. Furthermore, this barrier between the two sides may be readily removed by simply removing the clip and the inner member to permit mixing of the two or more separated components.

After such mixing, and in the case of a butt-end splice, one end of the container may be opened to receive the splice bundle to be encapsulated. Before insertion, the splice bundle is enclosed within a flexible spacer member such as an elongated boot.

It is therefore, an object of the present invention to provide a kit for encapsulating splices in sheathed or unsheathed multi-filament cables.

It is a further object of the present invention to provide means for packaging a plurality of materials used for encapsulating splices in multifilament cables.

It is a still further object of the present invention to provide means for inhibiting the intermingling of two or more compounds located within a single container.

It is another object of the present invention to provide an encapsulating kit for providing a suitable closure to surround and support an encapsulated splice in multi-filament cables.

It is still another object of the present invention to provide means for encapsulating a splice in multi-filament cables so that the walls of the solidified encapsulating compound are of substantially uniform thickness.

Another object of the present invention is the provision of means for separating two or more components located in a single container in such a manner that the container may be used as the closure for the resultant encapsulated splice.

Still another object of the present invention is the provision of a novel barrier for separating two or more components contained in a single container, such barrier being further useful to seal the closure of the resultant encapsulated splice.

An additional object of the present invention is the provision of a novel in-line closure for encapsulating splices in sheathed or unsheathed multi-filament cables which incorporates both means for centering the splice bundle within the encapsulating material and an end sealing technique which allows for a custom fit around cables of varying diameters.

Still other objects, features and attendant advantages of the present invention will become apparent to those skilled in the art from a reading of the following detailed description of the preferred embodiments constructed in accordance therewith, taken in conjunction with the accompanying drawings wherein like numbers designate like parts in the several figures and wherein:

BRIEF DESCRIPTION OF THE DRAWINGS

FIG. 1 is a perspective view of a portion of the present system for encapsulating splices in sheathed cables showing the technique of separating the individual components of a two-part encapsulating material;

FIG. 2 is an enlarged, end elevation view of the apparatus of FIG. 1;

FIG. 3 is a plan view of a first embodiment of a closed or open-cell flexible spacer member for centering the cable splice within the encapsulating material;

Figure 4:
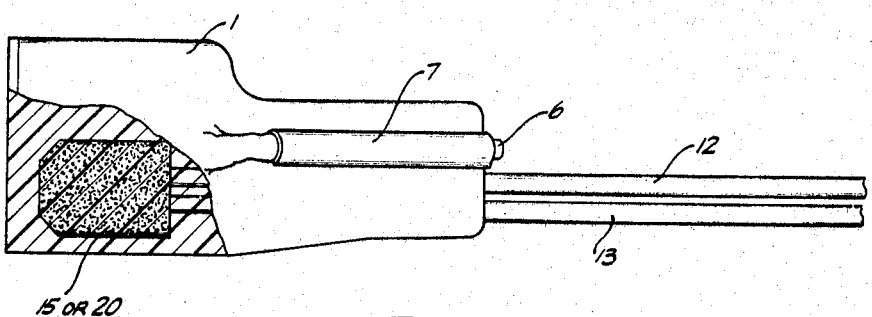
FIG. 4 is a plan view, partly in section, of a completed butt-end encapsulated splice.

The present invention deals with the encapsulating of splices in various types of cables which are generally sheathed, often with a plurality of coverings. These sheathed cables contain a plurality or bundle of filaments inside the sheath. These filaments are generally insulated electrical conductors, but may be conductors of air, other gases, fluids, etc. Many industries use such cables, one of the major users being the communications industry.

In general, splices are prepared in sheathed, multi-filament cables by joining together individual groups of two or more filaments from different cables. Each of the individual groups is joined together in turn until the splice is completed. Generally, the ends of the filaments are joined together with some type of connector. A splice is usually prepared so that there will be a bundle of connectors disposed symmetrically around the exposed bundle of filaments. By evenly distributing the connectors around the splice in this manner, the diameter of the splice is kept to a minimum. The exposed bundle of filaments and connectors is generally called the splice bundle.

Referring now to the drawings and, more particularly, to FIGS. 1 and 2 thereof, there is illustrated the present technique for separating two components which, when mixed, react to form an encapsulating material, comprising a flexible-walled, elongated, tubular container, generally designated 1, which is preferably formed of an impervious, tough material and which is sealed along edges 2 and 3 at opposite ends thereof by bonding, heat sealing, or other method known to those skilled in the art. A first component part 4 of the encapsulating material is located in a first end 2' of container 1 and the other component part 5 is located in the other end 3' of container 1. Component parts 4 and 5 are held apart in container 1 by means of an elongated, cylindrical member 6, which may be a rubber cord or spline, which has a length which is at least as great as the width of container 1 and a stiff, but flexible, U-shaped, clip member 7 whose length is approximately equal to the length of member 6 and which is adapted to be pressed over container 1 and member 6, as shown. Member 7 may typically be extruded from a suitable thermoplastic material.

Still referring to FIGS. 1 and 2, a first portion of clip 7, defined by the area between points 8 and 9, is substantially cylindrical with an inner diameter which is closely matched to the diameter of member 6. On the other hand, the remainder of clip 7, between points 8 and 9 on the opposite ends 10 and 11 thereof, are flared outwardly to permit the easy manipulation of clip 7. In addition, the portions of clip 7 between point 8 and end 10 and between point 9 and end 11 are spaced by an amount which is less than the diameter of member 6.

In operation, container 1 is adapted to be placed over member 6 with the entire width thereof in contact with member 6. Ends 10 and 11 of flexible clip 7 may then be readily spread and clip 7 positioned over member 6, as shown. Thereafter, when ends 10 and 11 are released, clip 7 will be held tightly in contact with member 6 to prevent intermingling of components 4 and 5 in ends 2′ and 3′ of container 1.

As will be apparent, ends 2′ and 3′ of container 1 may be filled with components 4 and 5 in various ways. For example, tubular container 1 may be cut to the desired length and members 6 and 7 positioned across the flattened midportion thereof. Ends 2 and 3, which are now open, may then be filled with appropriate quantities of component parts 4 and 5 whereupon ends 2 and 3 may be sealed. The fluid-tight separation provided by members 6 and 7 is so reliable that there is no possibility of components 4 and 5 intermingling prior to their removal. Even if considerable pressure is applied to container 1, the walls thereof will rupture before failure of the barrier occurs by spreading of clip 7.

It should be apparent that with the present configuration, it is a simple matter to break the barrier between ends 2′ and 3′ to form a single, continuous container whereby components 4 and 5 may be mixed. More specifically, clip 7 may be readily removed to free member 6 which, when also removed, permits free flow of components 4 and 5 between ends 2′ and 3′ of container 1. Subsequently, on a flat surface, or over the user's knee in the field, components 4 and 5 may be mixed by running the smooth side of clip 7 back and forth over one or both sides of container 1.

The two-part encapsulating compound is generally a dielectric resinous liquid which, when properly mixed for one minute, will sufficiently harden to bury or clamp in approximately 10 minutes or less. Suitable materials include polyesters, polyurethanes, epoxy compounds and the like. These materials may or may not contain fillers, wetting agents or other additives as desired. Such encapsulating materials are commercially available and well known to those skilled in the art.

Referring now to FIG. 3, there is shown a spacer member or boot used in encapsulating a butt-end splice. In the present case, assume it is required to splice a plurality of filaments contained in first and second sheathed cables 12 and 13. Individual groups of two or more filaments from opposite cables are first joined together using a plurality of suitable connectors 14 such as standard, type B, bond clips. The splice bundle is then ready for encapsulation. However, as indicated hereinbefore, it is desirable to provide means for insuring that the walls of the solidified encapsulating compound are of substantially uniform thickness. If a wall is too thin, cracking or failure may result. On the other hand, a wall which is too thick, results in a waste of encapsulating compound.

According to the embodiment of FIG. 3, centering of the splice bundle within the encapsulating material is guaranteed by providing a flexible spacer member in the form of an elongated boot 15. Three sides 16, 17 and 18 of boot 15 are closed, whereas the fourth side 19 is open to form a passageway 19′ into which the splice bundle may be introduced. By surrounding the splice bundle in this rapid and efficient manner, the splice bundle will be automatically centered when placed in the mixed encapsulating compound.

The flexible spacer member is preferably composed of open pore elastomeric material. The flexible spacer member is generally composed of some conventional porous foam, synthetic, polymeric material which is resilient and somewhat compressible. Suitable materials include, for example, polyurethane, butadiene-styrene, co-polymers, polyethylene, foam ruber, various vinyl foams and the like. An open-cell polyurethane foam which is uniformly coated with polyethylene for high resistance to deterioration or swelling is desirable. Such foam products are generally available commercially.

After the splice bundle is prepared and positioned in the flexible spacer member and the encapsulating compound is mixed, it is necessary to provide a suitable mold or enclosure for the terminals to be encapsulated. According to one embodiment of the present invention, container 1 serves the dual purpose of containing the compound and providing such an enclosure. In other words, after components 4 and 5 in container 1 have been thoroughly mixed, the compound may be pushed to one end, such as end 3′, thereof and the top of end 2′ cut off, along edge 2, to provide an opening. The splice bundle, surrounded by the foam centering boot, may then be inserted through this opening until the foam boot contacts edge 3 of container 1. The encapsulating compound will flow freely through the open-pore spacer member and thoroughly saturate this member. In addition, the splice bundle will automatically be centered in the enclosure by the foam boot so that the walls of the finished splice closure are of substantially uniform thickness.

Referring now to FIG. 4, after this is achieved, the excess bag material around cables 12 and 13 may be folded, crimped or gathered, and member 6 and clip 7 applied to hold the excess material gathered about the cabling. In other words, after the splice bundle has been bottomed within container 1 and the excess girth of the bag tightly crimped around cables 12 and 13, member 6 is applied to hold the bag snugly gathered adjacent cable 12 or 13. Clip 7 may then be positioned over member 6 with container 1 therebetween to provide a tight seal. Or clip 7 may be positioned directly over cable 12 or 13 to serve the same purpose.

It can therefore be seen that through proper use and application of the present system for encapsulating splices in sheathed or unsheathed multifilament cables, a more efficient and faster work operation can be developed in outside plant and construction and maintenance operations. The advantages of the present system should be apparent. The present system is clearly easier to use than prior art systems and can be provided at a substantially lower cost. An efficient technique is provided for packaging the separate components used to make the encapsulating materials with a barrier which may be rapidly and efficiently removed and used for mixing of the components. The same container used for the encapsulating material may also be used as the finished closure. Finally, centering of the splice area within the encapsulating compound is achieved in a rapid and efficient manner by providing a closed or open-cell, flexible spacer member in a series of shapes which are designed for use in all situations commonly encountered.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

We claim:

1. An encapsulating kit for use in encapsulating conductor terminals and the like in a fluid-tight protective enclosure of non-conductive materials immune to attack by the elements, said kit comprising an elongated flexible-walled container charged with polymerizable potting compound ingredients held segregated until ready for use by barrier means extending crosswise of the mid portion of said container, a deep cup-shaped boot of thick spongy porous material sized to snugly embrace conductor terminal to be encapsulated within one end of said flexible-walled container, said barrier being breakable to permit thorough intermixing of said potting compound ingredients, and said boot being adapted to embrace at least one conductor terminal while submerged in the freshly mixed potting compound at one end of said container and holding the adjacent walls thereof spaced from the conductor terminal while said potting compound takes a firm set.

2. An encapsulating kit as defined in claim 1 characterized in that said barrier means for said container comprises an elongated inner member and U-shaped resilient clip means engageable with the opposite sides of said elongated member and cooperable therewith to clamp the walls of said container against one another between said member and said clip means, and said barrier means being usable after said potting compound ingredients have been mixed together to clamp the open end of said container gathered about a conductor having its terminal end submerged in said potting compound.

References Cited

UNITED STATES PATENTS

| | | |
|---|---|---|
| 2,756,874 | 7/1956 | Erickson et al. |
| 2,831,446 | 2/1958 | Schwartz _____ 174—87 X |
| 3,038,558 | 6/1962 | Plummer _____ 150—52 X |
| 3,087,606 | 2/1963 | Bollmeier et al. |
| 3,243,758 | 3/1966 | Frant et al. |
| 3,359,361 | 12/1967 | Oakman. |
| 3,419,669 | 12/1968 | Dienes _____ 174—76 X |

JOSEPH R. LECLAIR, Primary Examiner

U.S. Cl. X.R.

174—76; 229—56